United States Patent [19]

Ishibashi

[11] 4,319,111

[45] Mar. 9, 1982

[54] HIGH FREQUENCY INDUCTION HEATING APPARATUS HAVING A VACUUM OSCILLATOR MEANS

[75] Inventor: Kazuhisa Ishibashi, Yokohama, Japan

[73] Assignee: Toyo Seikan Kaisha, Ltd., Tokyo, Japan

[21] Appl. No.: 47,647

[22] Filed: Jun. 11, 1979

[30] Foreign Application Priority Data

Jul. 12, 1978 [JP] Japan .................................. 53-84919

[51] Int. Cl.³ .............................................. H05B 6/44
[52] U.S. Cl. ............................... 219/10.69; 219/10.75; 219/10.79; 219/10.53; 336/186
[58] Field of Search ............... 219/10.69, 10.71, 10.73, 219/10.67, 10.75, 10.79, 10.77, 10.57, 10.49 R, 10.43, 10.41, 10.53; 156/272, 275, 380, 69; 198/645, 655, 688, 690, 952; 336/232, 186, 40

[56] References Cited

U.S. PATENT DOCUMENTS

| | | | |
|---|---|---|---|
| 2,386,819 | 10/1945 | Sherman | 219/10.79 |
| 2,419,116 | 4/1947 | Cassen et al. | 219/10.61 X |
| 2,818,483 | 12/1957 | Blume | 219/10.41 |
| 3,005,893 | 10/1961 | Dixon et al. | 219/10.79 |
| 3,694,609 | 9/1972 | Kennedy | 219/10.79 |
| 3,704,357 | 11/1972 | Moulin | 219/10.75 X |
| 4,017,704 | 4/1977 | Collins, Jr. et al. | 219/10.79 |

OTHER PUBLICATIONS

Basics of Induction Heating, vol. I, p. I-123, by Tudbury, "Mechanical Forces on Coils", May, 1960.
Electromagnetics, Chapter 2, pp. 64-65, by Kraus, "Dielectic Strength", 1953.

Primary Examiner—B. A. Reynolds
Assistant Examiner—Philip H. Leung
Attorney, Agent, or Firm—Pennie & Edmonds

[57] ABSTRACT

A high frequency induction heating apparatus for heating articles where the apparatus has a heating station, a source of high frequency current including a vacuum tube oscillator means and a plurality of high frequency electric conductors which extend through the heating station and which are connected to the source and to ground. The conductors are series connected such that one-half of the conductors form inflow conductors positioned adjacent one another in one-half of the heating station and the remaining one-half of the conductors form outflow conductors positioned adjacent one another in the remaining one-half of the heating station. Conductors connected closer to the source are positioned further from the article to be heated than conductors connected closer to ground in order to prevent dielectric breakdown between the conductors and the article to be heated.

4 Claims, 6 Drawing Figures

HIGH FREQUENCY INDUCTION HEATING APPARATUS HAVING A VACUUM OSCILLATOR MEANS

FIELD OF INVENTION

A high frequency induction heating apparatus for heating an article such as a metal shell where the apparatus includes a heating station, a source of high frequency current including a vacuum tube oscillator means and a plurality of high frequency electrical conductors extending through the heating station which are connected to the source and to ground. One-half of the conductors form inflow conductors which are positioned adjacent one another in one-half of the heating station while the remaining one-half of the conductors form outflow conductors positioned adjacent one another in the remaining one-half of the heating station. The conductors connected closer to the source are positioned further away from the article to be heated than conductors positioned closer to ground so as to prevent dielectric breakdown between the conductors and the article.

BACKGROUND ART

Induction heating apparatus utilizing high frequency power on the order of 10 kilohertz or more has been used in various applications and is particularly adaptable for imparting large amounts of heat uniformly to articles that are continuously supplied to the apparatus. An example of such an apparatus is that used to heat the bottom of a metal shell where a resin sheet is later adhered to the bottom inside surface of the metal shell to form a cap for a bottle or container. In such an instance when a metal cap is fastened onto a bottle or container opening, the resin sheet, which may comprise vinyl chloride, polyethylene or polypropylene acts as a seal or packing material between the bottle mouth and the cap. In order that the resin sheet may be affixed firmly to the inner bottom surface of the metal shell, an adhesive primer such as epoxy is painted on the inner bottom surface of the shell, the primer is then heated to a molten state, and the resin sheet then attached to the molten primer. The primer usually adheres to the resin sheet and to the bottom of the shell when the shell bottom surface is heated to approximately 100°–200° C. and where the heating is by high frequency induction heating. Such caps may include screw caps, crown caps and pilfer-proof caps wherein practically every cap has a resin sheet affixed to the bottom surface of the metal shell portion of the cap by a primer and where the sheet serves as a seal.

Metal cap materials used to date generally have comprised strongly magnetic materials, such as tin plate or tin free steel, and high frequency induction heating apparatus has been used in producing such caps. In recent years however non-magnetic material, such as aluminum and aluminum alloys, have come into wide use as cap materials. When using non-magnetic material, heating efficiency declines when using a high frequency induction heating apparatus and often it becomes impossible to heat the metal shells sufficiently to adhere a resin sheet thereto.

In order to increase heating efficiency, various approaches have been suggested. One approach involves using a vacuum tube type high frequency power generating circuit including tank coils utilized as heating coils and increasing the number of turns of the heating coils. Another approach involves reducing the interval between the heating coils and the metal shell being heated. However when these approaches have been followed, dielectric breakdowns often occurred between the heating coils and the article being heated and between adjacent coils themselves. This tendency of dielectric breakdown becomes a significant defect when vacuum tube type high frequency power generating tubes are used since high voltages on the order of 10 kilovolts are applied directly to the heating coils with the result that spacings between the coils and article to be heated have to be large. This leads to loss of heating efficiency and an apparatus which is not subject to minaturization.

A further problem existing with prior art apparatus utilizing high frequency induction heating is that a metal article made of non-magnetic material will float and jump away from the conductors due to repulsion forces arising between the magnetic field of the high frequency heating coil and the currents induced in the bottom of the article with the result that the article can not be heated sufficiently.

It is therefore an object of the present invention to provide for a high frequency induction heating apparatus which may be utilized to heat articles made of non-magnetic materials and where the apparatus may be miniaturized without incurring dielectric breakdown between the article to be heated and parts of the apparatus.

It is a further object of the invention to provide for a high frequency induction heating apparatus including a plurality of high frequency electrical conductors which are adjacent one another and which are so arranged with respect to one another that dielectric breakdown between conductors is prevented.

A still further object of the invention is to provide a means in a high frequency induction heating apparatus including a vacuum tube type oscillator means for preventing movement of an article to be heated away from the conductors because of any repulsion effect.

DISCLOSURE OF INVENTION

Broadly a high frequency induction heating apparatus constructed according to the invention has a heating station and a source of high frequency current including a vacuum tube oscillator means. A plurality of high frequency electrical conductors extend through the heating station with one-half of the conductors forming inflow conductors and one-half outflow conductors. The inflow conductors are positioned in one-half of the heating station and the outflow conductors are positioned in the other half. The current passing through the inflow and outflow conductors is in mutually opposite directions. The conductors are connected in series with the source of high frequency current and to ground. The conductors connected closer to the source are positioned further away from the article to be heated than conductors connected closer to ground so as to reduce any tendency of dielectric breakdown between the conductors and the article.

In one form of the invention, the conductors lie in a plurality of parallel planes which extend beneath the article to be heated with the conductors connected closer to the source being in planes located farthest from the article to be heated and with the conductors connected closer to ground being located in planes closer to the article.

In a further embodiment of the invention, the conductors lie in a group contained within a single plane positioned beneath the article to be heated wherein the conductors connected closer to the source are positioned at the edge of the group and with the conductors connected closer to the ground being located closer to the center of the group.

The conductors in both embodiments are positioned with respect to one another so as to reduce the likelihood of dielectric breakdown between adjacent conductors.

Preferably a guide plate is included in the apparatus to limit movement of articles to be heated away from the conductor because of any repulsive force existing between currents induced in the article and current flowing through the conductors. This insures that the bottom surface of the article will remain sufficiently close to the conductors to provide effective heating of the article.

BEST MODE FOR CARRYING OUT THE INVENTION

Figure 1:
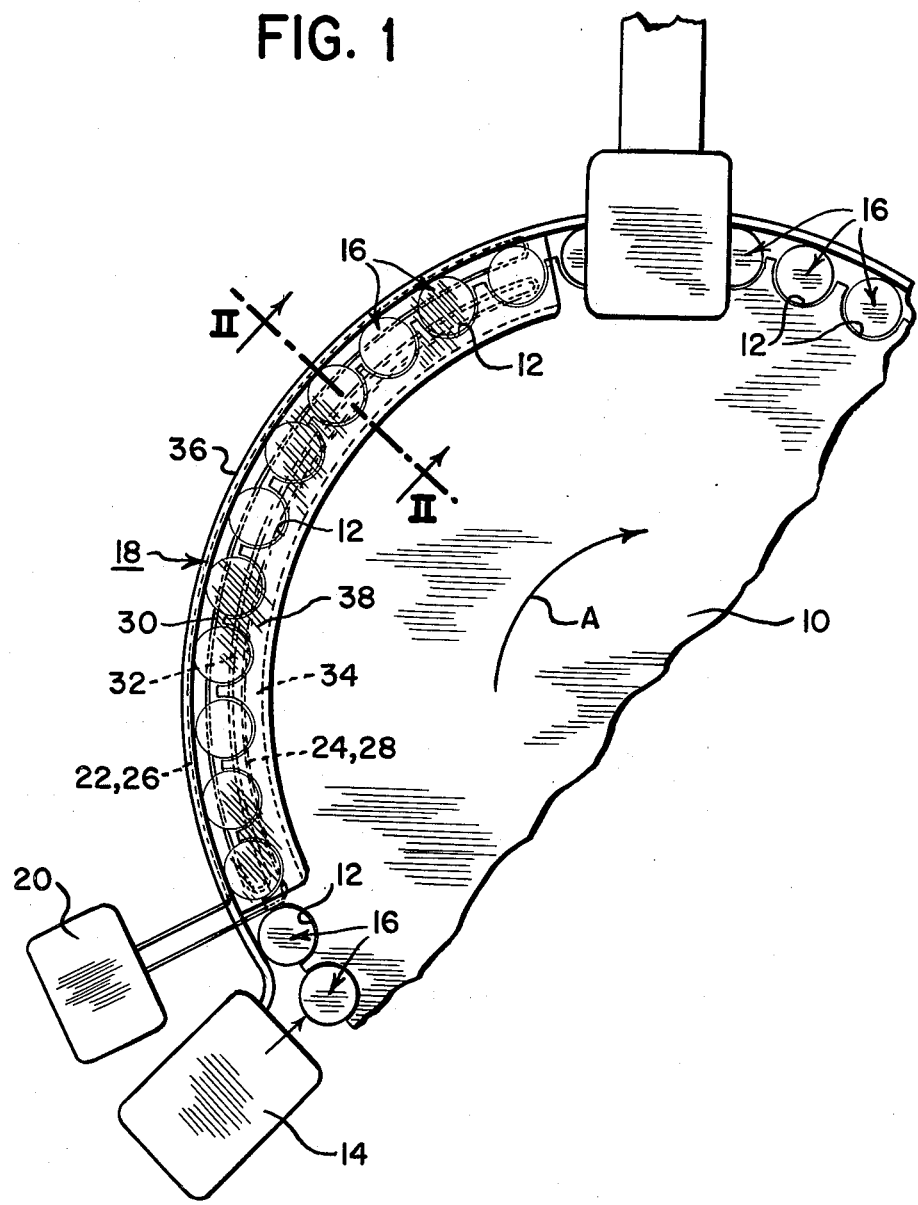
FIG. 1 is a partial plan view of a high frequency induction heating apparatus constructed according to the invention.

Referring to FIG. 1 there is illustrated a high frequency induction heating apparatus comprising a turntable 10 having a plurality of semi-circular notches 12 spaced at equal intervals on the outer periphery thereof which are adapted to engage metal shells 16 which are supplied to each notch from a supply chute 14. The metal shells 16 are fed by the chute 14 so that they are inserted into the notches one at a time with the bottom sides being faced downwardly. Shells 16 are transported in the direction of the arrow A by the table 10 through a high frequency induction heating station 18 where they are heated to a temperature of, for example, 100°-200° C. after which they are transported to a sealing material supply station.

Heating station 18 has three windings of coils which form tank coils of a vacuum tube oscillator circuit which is supplied by a source 20 of high frequency electrical power.

Figure 2:
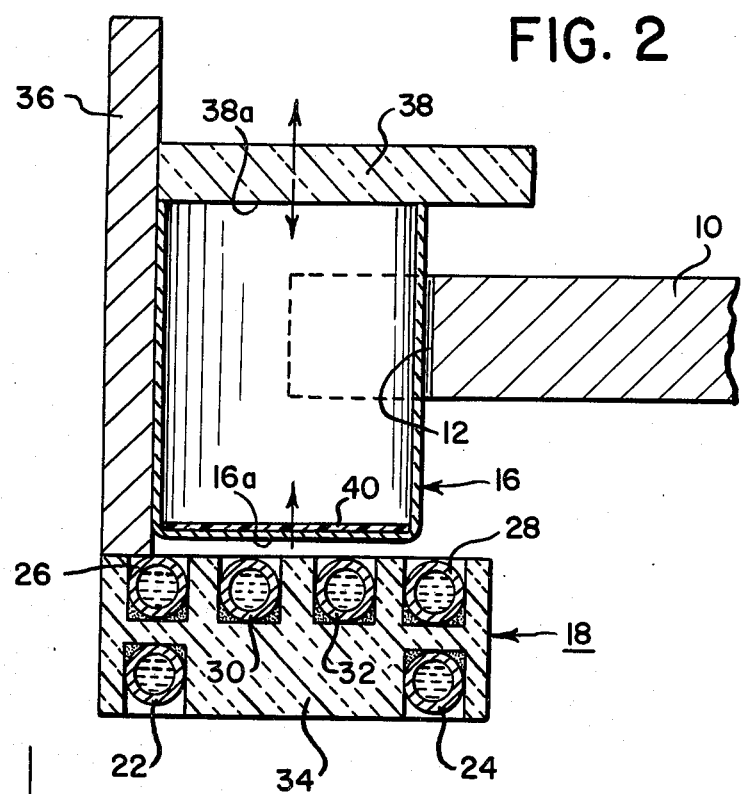
FIG. 2 is an enlarged sectional view of FIG. 1 taken along lines II—II.

Referring to FIG. 2 current conductors 22, 24, 26, 28, 30 and 32 are shown forming three windings of high frequency induction heating coils which are set into an arc-shaped coil base plate 34 comprising a silicon resin, Teflon resin or Bakelite and which is positioned below the outer peripheral surface of the turntable 10. As each shell 16 is moved into the heating station 18, the shell moves over the coils and is heated by a current flow induced into the shell by the coils. During the heating operation each shell 16 is guided during movement by the turntable 10 by the guide wall 36 positioned beyond the periphery of the table. A further guide plate 38 is attached to guide wall 36 and is positioned above the outer periphery of the turntable 10. When shell 16 comprises a non-magnetic material such as aluminum and is moved over the high frequency current conductors, the shell tends to float and jump upwardly because of the repulsive forces existing between the current conductors and the shell. As seen from FIG. 2, the open surface of the shell 16 impinges upon the facing surface 38a of the guide plate 38 so that the shell 16 slides along the facing surface as it is moved by turntable 10. Bottom 16a of shell 16 is maintained at a predetermined distance above the electric conductors so that it is heated efficiently and substantially uniformly. As a result adhesive primer 40 is heated to a molten state to adhere to the shell and to also adhere to a resin sheet applied at a later processing station.

Guide plate 38 can be vertically adjusted to adjust the interval between the conductors and the facing surface 38a of the guide plate to accommodate shells of various heights. As the shell strikes the guide plate 38 with some force, it is necessary that the plate be sufficiently strong and also sufficiently smooth such that the shell 16 may slide over the surface 38a. In the example illustrated, a strengthened glass plate having a thickness of 5-10 millimeters provides a structure of sufficient strength and smooth surface and at the same time makes it possible to observe the condition and movement of the shells through the heating station.

Figure 3:
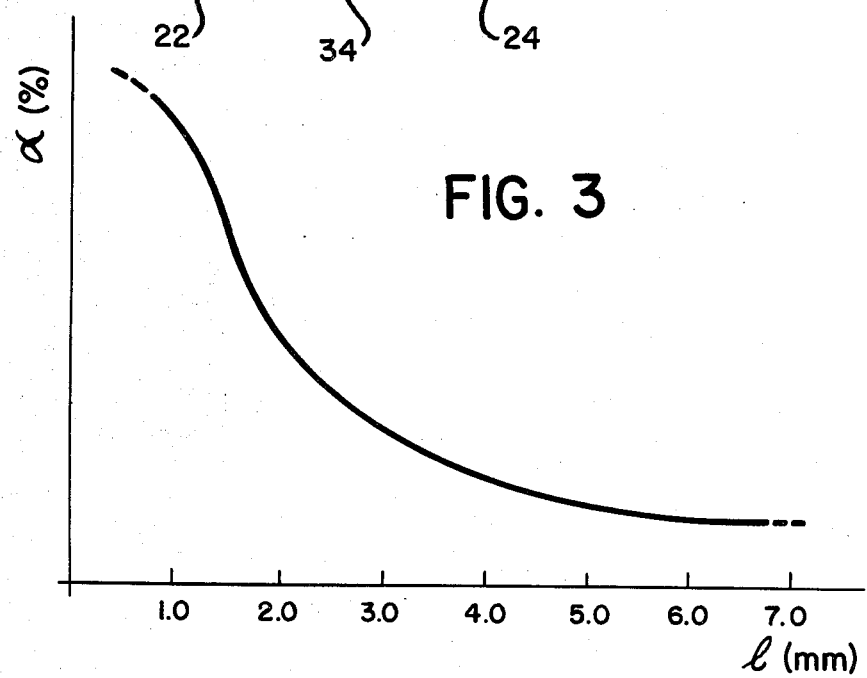
FIG. 3 is a graph illustrating percentage of temperature rise of an article heated as a function of distance "1" of the article from the conductors.

The spacing between the current conductors and the article to be heated should be as small as possible for efficient heating of articles made of non-magnetic materials. Referring to FIG. 3, it is seen that the temperature rise ratio alpha of a shell bottom 16a as compared against interval "1" between the shell bottom 16a and the upper ends of the conductors 30 and 32 varies according to distance such that for most efficient heating, the distance "1" should be 2 millimeters maximum and preferably 1.5-0.5 millimeters. However, if the distance is made too small, a danger of dielectric breakdown arises between the current conductors and the article to be heated, which as with reference to FIG. 4, may be prevented by particular placement of particular conductors.

Figure 4:
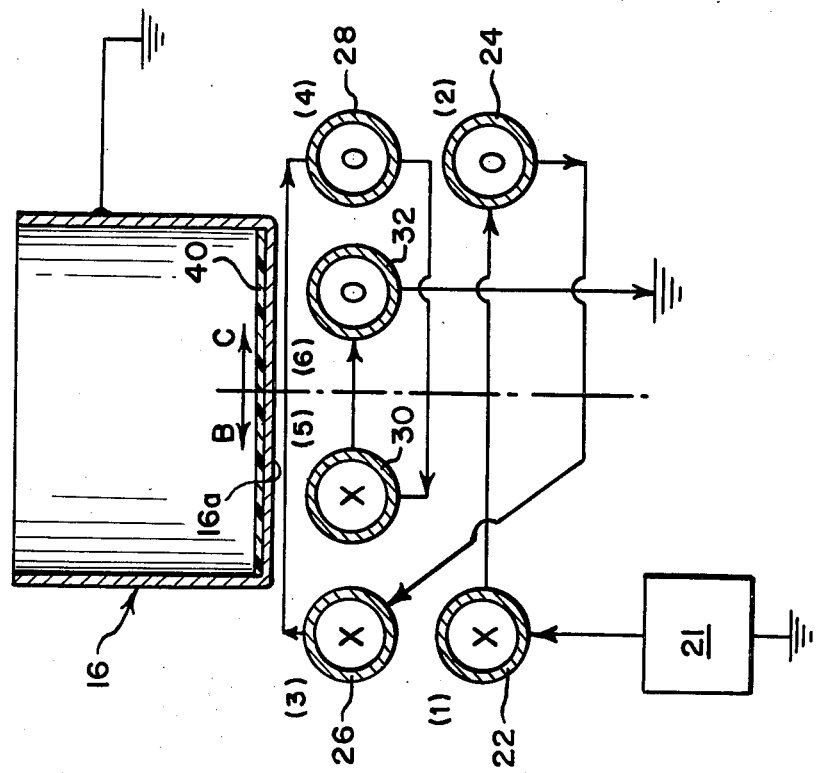
FIG. 4 is a diagrammatical sketch of the conductor arrangement of FIG. 2 illustrating the electrical connection of the conductors.

Referring to FIG. 4 high frequency current conductors 22, 25 and 30 form outflow current conductors which are arranged in one-half of the induction heating station as represented by the arrow B in the drawings. The three high frequency current conductors 24, 28 and 32 which form inflow conductors are arranged in the other one-half of the heating station as represented by the arrow C. As shown in FIG. 4, it is possible to form the conductors into three windings of high frequency heating coils, and by arranging the inflow and outflow circuits in the respective one-halves of the heating zone so that the flow is in mutually opposite directions, an induction current is excited in the shell 16 in the form of a closed circuit which creates a temperature rise from Joule heat.

High frequency power source 20 includes a vacuum type oscillator having a high frequency on the order of 100 kilohertz to 10 megahertz and the effective value of the voltage created in the tank coils, which are the heating coils, is a high voltage on the order of nearly 10 kilohertz. One end of the high frequency circuit 21 is connected in series to the conductors 22, 24, 26, 28, 30 and 32 with the end of the last conductor 32 being connected to ground. As shown in FIG. 4 the conductors 30 (5) and 32 (6) connected closest to ground are positioned closest to the metal shell 16 with the remainder of the connectors being arranged successively further from the shell 16 as their nearness to the high voltage source increases. That is, conductors 26 (3) and 28 (4) are positioned further from the shell 16 than conductors 30 (5) and 32 (6) while conductors 22 (1) and 24 (2) which are connected closest to the high voltage source are positioned farthest from the shell 16.

Figure 5:
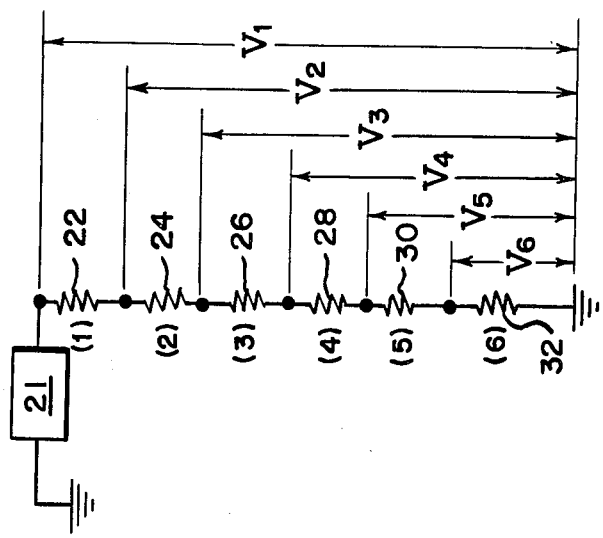
FIG. 5 is a circuit diagram illustrating potential differences between the conductors of FIG. 4 and ground.

The potential of the high voltage side of each conductor against the ground zero potential is, as shown in FIG. 5, $V_6$ for conductor 32, $V_5$ for conductor 30, $V_4$ for conductor 28, $V_3$ for conductor 25, $V_2$ for conductor 24 and $V_1$ for conductor 22 and these potentials also exist with respect to the shell 16 since in the conventional case, the shell is grounded. With the present invention, it is possible to even out the potential gradient between shell 16 and each of the various conductors so that the gradient is below that which would result in a dielectric breakdown between the shell and any of the conductors. This is accomplished by arranging the conductors so that the conductors connected closer to the high voltage source, for example conductors 22 (1) and 24 (2) are separated or positioned further from the shell 16 than are conductors located closer to ground, for example conductors 30 (5) and 32 (6). Conductors positioned closest to the shell 16 have their service sufficiencies lowered because of induction current excited in the shell, but by the present invention, coils having a plurality of turns are used making it possible to place the conductors connected closest to ground much closer to the shell than was able previously, and since the conductors connected closer to the high voltage source are also used to excite induction current, it is possible to increase overall heating efficiency substantially as compared to prior art devices. Unlike the prior art, since it is possible to control the potential gradient between the ground side conductors and the shell to a very small degree, it then becomes possible to increase the high frequency generating voltage thus making it possible to increase heating efficiency from the induced current by increasing its voltage. In addition, as distinguished from prior art devices, heating efficiency can be further increased by increasing the number of coil windings and decreasing the spacing between the conductors and the article to be heated.

Further apparatus constructed according to the invention reduces dielectric breakdown between adjacent conductors since the distance between the conductors may be selected according to their potential differences such that the potential gradient between adjacent conductors may be lowered to prescribed maximum amounts. For example, in the one-half B portion of the heating station, the intervals between conductors 22 and 26 and 26 and 30 are the same whereas the interval between the conductors 22 and 30 is much larger so that the potential gradient between each conductor is kept to a fixed maximum value. In a similar manner in the one-half C portion of the heating station, the interval between conductors 24 and 32 is much larger than the interval between the other conductors such that the potential gradient between the conductors is kept below a fixed maximum value.

In the embodiment of FIG. 4 the conductors extend in two planes such that conductors 22 and 24 are positioned in a plane below that of conductors 26, 28, 30 and 32. This results in a construction where the plurality of conductors can be compactly embedded in base plate 34.

Figure 6:
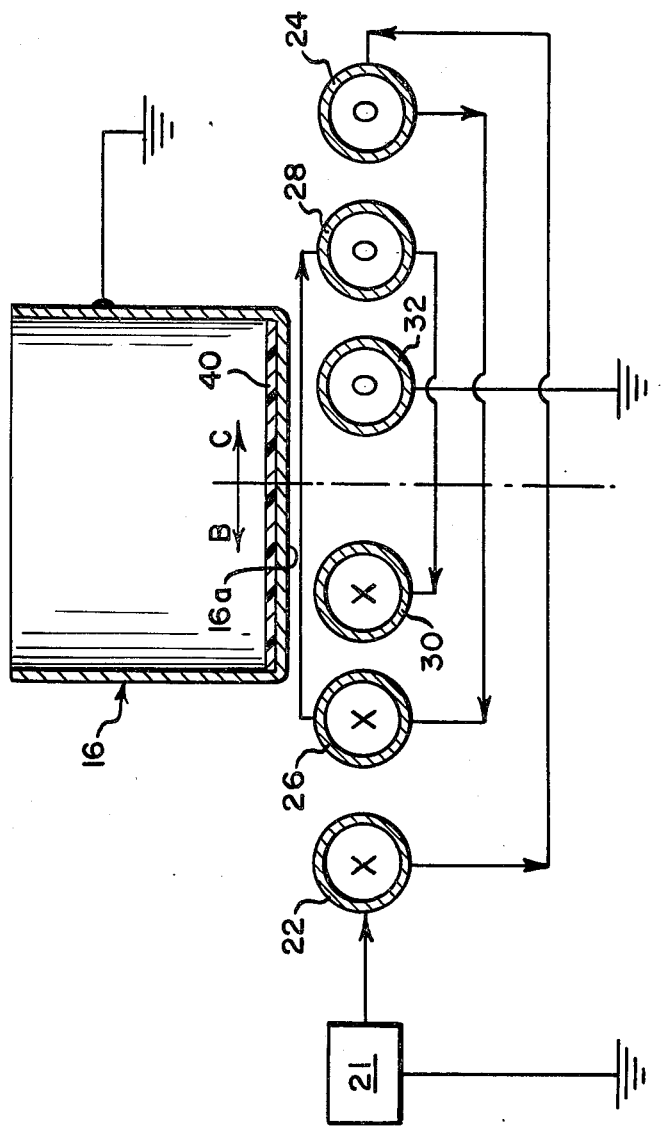
FIG. 6 is a diagrammatical sketch illustrating connection and placement of conductors in a further embodiment of the apparatus of FIG. 1.

Referring to FIG. 6 a further embodiment is shown in which all of the conductors are arranged in a group in a single plane with the conductors being connected closest to the high voltage source being positioned at the edge of the group farthest from the article to be heated, and with the conductors being connected closer to ground being positioned more towards the center of the group and closer to the article being heated.

The two stage heating coil embodiment of FIG. 4 where the conductors are arranged in two stages or planes is preferable over the single stage or single plane arrangement of FIG. 6 because the rate of contribution to heating by current conductors 22 and 24 in the two stage embodiment is approximately twice as great as in the single stage embodiment.

The conductors shown in both embodiments described preferably comprise copper tubes with cooling water being supplied therein to reduce generation of heat from resistance losses in the conductors.

When the bottom 16a of the shell 16 is heated by apparatus as described above, a temperature difference of about 20°–30° C. will occur on the bottom. In order to eliminate this temperature difference, shell 16 may be rotated during induction heating. This may be accomplished by applying a lining of a low friction material, such as Teflon, to notches 12 of turntable 10 and applying a lining of an elastic material, such as silicon rubber having comparatively high friction co-efficient, to the surface of guide wall 36 which is in contact with the shell. With this construction each shell will rotate as it is moved by the turntable 10 which will result in even heating of the bottom surface 16a and thus reducing temperature differences.

While the apparatus described discloses a turntable for moving an article to be heated through a heating station and shows the use of a guide plate to prevent movement of the article away from the heating coils, the same effect could be achieved by constructing the guide plate as a conveyor belt or as part of a rotary cylinder apparatus.

Apparatus as disclosed makes it possible to arrange current conductors and articles to be heated close to one another without causing dielectric breakdowns with a result that induction heating efficiency is increased. Further the apparatus provides structure making it possible to reduce dielectric breakdowns between the conductors themselves since potential difference between adjacent conductors determines the positioning of the conductors.

In addition, apparatus constructed according to the invention can result in structure which may be minaturized so as to be highly efficient when utilized in the heating of non-magnetic articles.

I claim:

1. In a high frequency induction heating apparatus for heating an article where said apparatus has a heating station, means for moving an article through the heating station, a source of high frequency current including a vacuum tube oscillator means, and a plurality of high frequency electrical conductors extending substantially parallel to the path of movement of an article through said heating station connected to said source and to ground; the improvement comprising in that all said conductors are connected in a single series with one end of the series being connected to ground and the other end of the series being connected to said source, in that one-half of said conductors form inflow conductors positioned adjacent one another in one-half of said heating station, in that the remaining one-half of said conductors form outflow conductors positioned adjacent one another in the remaining one-half of said heating station with the flow of current in said inflow conductors and said outflow conductors being in mutually opposite directions, in that conductors connected closer to said source are positioned further from an article to be heated moving through said heating station than conductors connected closer to said ground whereby the potential gradient between each conductor and article to be heated is controllable to a fixed maximum value to prevent dielectric breakdown between the conductors and an article, and in having a guide plate positioned on a side opposite the article to be heated than said conductors whereby a movement of the article away from the conductors due to any repulsive effect arising from the current induced in the article and flowing in said conductors will be limited.

2. In a high frequency induction heating apparatus according to claim 1 the improvement further comprising in that the interval between adjacent conductors is set to correspond with the potential difference between the conductors whereby the potential gradient between adjacent conductors is controlled to prevent dielectric breakdown between conductors.

3. In a high frequency induction heating apparatus according to claim 1 wherein all said conductors lie in a group in a single plane extending beneath the article to be heated and wherein the conductors connected closer to said source are located nearer the edge of the group and wherein the conductors connected closer to said ground are located nearer the center of the group.

4. In a high frequency induction heating apparatus for heating an article where said apparatus has a heating station, a source of high frequency current including a vacuum tube oscillator means, and a plurality of high frequency electrical conductors extending through said heating station connected to said source and to ground; the improvement comprising in that said conductors are connected in series, in that one-half of said conductors form inflow conductors positioned adjacent one another in one-half of said heating station, in that the remaining one-half of said conductors form outflow conductors positioned adjacent one another in the remaining one-half of said heating station with the flow of current in said inflow conductors and in said outflow conductors being in mutually opposite directions, in that said conductors lie in a plurality of parallel planes extending beneath an article to be heated, in that conductors connected closer to said source are located in a plane further from an article to be heated than conductors connected closer to ground whereby the potential gradient between each conductor and an article to be heated is controllable to a fixed maximum value to prevent dielectric breakdown between the conductors and an article, and in that a guide plate is positioned on a side opposite of an article to be heated from said conductors whereby any movement of an article away from the conductors due to any repulsion effect arising from current induced in an article and flowing in said conductors will be reduced.

* * * * *